United States Patent Office 3,245,845
Patented Apr. 12, 1966

3,245,845
METHOD OF PREVENTING LEAKS IN SOLDERED JOINTS AND SOFT SOLDER COMPOSITION USEFUL THEREIN
Peter L. Krohn, 170 Shawnee Ave., Easton, Pa.
No Drawing. Filed Dec. 16, 1963, Ser. No. 330,535
2 Claims. (Cl. 148—23)

The present invention is directed to a method for preventing leaks in soldered joints and to a soft solder composition useful therein.

Soft solders comprise solders containing a major weight percentage of tin or lead. In addition, minor weight percentages of antimony, bismuth, silver, or cadmium may be present. A large number of soft solder compositions have been described in the literature and the properties of a variety of soft solder alloys are set forth at Table I at page 939 of volume 20 of the 1960 Edition of the Encyclopaedia Britannica. Soft solders range in temperature from a solidus temperature of 361° F. to a liquidus temperature of up to about 594° F.

While literally thousands of soft solder compositions have been described, generally common tinner's solder is composed of equal parts of tin and lead; plumber's solder has two parts of lead to one part of tin, and common pewterer's solder composition include four parts of lead, three parts of tin, and two parts of bismuth; or one part of lead, two parts of tin, and one part of cadmium.

A wide variety of fluxes for soft solders are described in the literature including powdered resin, hydrochloric acid "killed" by the addition of zinc scraps, tallow, zinc chloride, and zinc chloride and ammonium chloride.

Until the advent of the present invention, there has been no rapid accurate method for making certain that a solder joint has in fact been soldered. Thus, in assemblies where there may be large numbers of soldered joints, it is very difficult to rapidly test to determine whether soldering has been effected, or whether due to an oversight or some malfunction, the joint has not been soldered, namely, the joint has not been raised to a soldering temperature.

This invention has an object the provision of a rapid method for detecting soldered joint failures, namely joints which were to have been soldered which were not in fact raised to soldering temperature.

This invention has as another object the provision of a soft solder composition which enables rapid and accurate detection of non-soldered joints to be achieved.

Other objects will appear hereinafter.

These and other objects are achieved by the soft solder composition of the present invention which includes a minor amount of a phosphor, which luminesces when exposed to ultraviolet light, and which is decomposed at a temperature between the solidus and the liquidus temperature of the solder. The method of my invention comprises the detection of non-soldered joints by the inspection of soldered joints with an ultraviolet light. Upon the exposure of a non-soldered joint to ultraviolet light, the non-decomposed phosphor will luminesce, whereby the location of the non-soldered joint will be indicated.

By the soft solder compositions of the present invention is meant to include the soft solder together with its flux, since advantageously the phosphor is incorporated into the flux used in conjunction with the solder, as by blending the phosphor with a non-corrosive type of flux such as resin, or a corrosive type of flux such as zinc chloride or zinc chloride and ammonium chloride.

The phosphors contemplated in the present invention comprise those materials which are excited to luminesce by ultraviolet light, namely light having a wavelength of below 4000° Angstroms, and which either decompose or cease functioning as a phosphor once their temperature is raised to a temperature above the solidus temperature of the soft solder composition. As a result, when a soldered joint having such material therein is inspected with an ultraviolet light, there will be no luminescence. However, when a joint has not been raised to a temperature sufficiently high to effect soldering, and is then exposed to ultraviolet light, the phosphor will luminesce indicating the presence of a non-soldered joint.

Research into the field of phosphors has been extensive, and as indicated at page 484F of volume 14 of the 1960 Edition of the Encyclopaedia Britannica, literally hundreds of thousands of different phosphors have been synthesized and tested during luminescence research of the past few decades. Accordingly, it is not possible to categorize all of the different phosphors which may be used in the soft solder compositions of the present invention, just as the wide variety of soft solder compositions prevents the listing of all suitable soft solder compositions. However, reference to the following examples will serve to illustrate the present invention:

A wide variety of zinc sulphide phosphors have been described in the literature, which are "temperature quenched" and "killed" when raised to a specific temperature. Most of these zinc sulphide phosphors include minor amounts of nickel. There is a detailed discussion of a wide variety of these zinc sulphide phosphors, and the literature references thereto, in Chapter IV of Luminescent Materials by G. F. J. Garlick, published by the Oxford University Press, 1949. Many of these phosphors are excited by ultraviolet light, and are "killed" by being raised to a temperature above room temperature and up to the range 361° F. to 594° F.

There are many organic materials which fluoresce under ultraviolet light, and which can be decomposed and/or melted so as to be diffused when raised to a temperature within the range 361° F. to 594° F. Examples of these materials include anthracene and naphthalene. For example, crystalline anthracene is highly fluorescent under ultraviolet light. Melted anthracene is not fluorescent. If anthracene is used in minute concentrations, it will fluoresce, but once having been melted will dissipate to a concentration below that which will enable fluorescence to be detected under ultraviolet light. Similarly naphthalene may be used. This material fluoresces under ultraviolet light, and when heated to a temperature within the range 361° F. to 594° F. will diffuse and/or sublime so that once heated to this temperature range it will no longer fluoresce when exposed to ultraviolet light. A wide variety of solid organic phosphors may be used which decompose on being heated to a temperature of 361° F. to 594° F. Examples of these materials include trypaflavine, aminobenzalmalononitrile, dimethylamino-alpha-phenylcinnamonitrile, and para-dimethylaminophenyl.

A wide variety of organic solid solutions are described in the literature which fluoresce in the ultraviolet region, but which are readily destroyed, or diffused, or sublimed on being heated to the temperature range of 361° F. to 594° F. Examples of these materials include phenanthrene-anthracene mixtures, and mixtures of pyrene and chrysene, etc.

A large number of phosphorescent systems are known which become oxidized when heated in air to a temperature of up to 361° F. to 594° F., with the destruction of the phosphorescent system. Thus, a wide variety of phosphorescent dyes undergo oxidation in this temperature range, and lose their phosphorescence. Examples include trypaflavine. Still other organic compounds undergo cistrans isomerization upon being heated, with either the cis or trans state not being fluorescent. For literature references, see Fluorescence and Phosphorescence by Pringsheim, page 395–397, published in 1949, Interscience Publishers, Inc.

The following examples are illustrative of compositions of the present invention (when "parts" is used, it is meant "parts by weight"):

*Example 1*

A soft solder of 50 parts tin, 50 parts lead, and from 0.12 to 0.50 parts antimony was used. The antimony could be varied within the aforesaid range without markedly varying the properties of the solder. The solder had a specific gravity of 8.85.

*Example 2*

The solder of Example 1 was used with a flux comprising 90 parts petrolatum and 10 parts ammonium chloride, said petrolatum and ammonium chloride hereinafter called "flux" in Examples 3 through 9, into which was blended a trace amount of trypaflavine sufficient to luminesce when the solder and flux were exposed to ultraviolet light, but which would become oxidized when heated to a temperature above 361° F. in air and hence would not fluoresce after the mixture had been heated to 361° F.

*Example 3*

In place of the flux of Example 2, a flux consisting of 40 parts zinc chloride, 20 parts ammonium chloride, and 40 parts water was used.

*Example 4*

In place of the flux of Example 2 a flux comprising a solution of rosin and alcohol was used.

*Example 5*

In place of the flux of Example 2 a flux consisting of equal parts by weight of zinc chloride and petrolatum was used.

*Examples 6, 7, 8 and 9*

With these examples, the solder of Example 1 and the flux of Example 2 (for Example 6), Example 3 (for Example 7), Example 6 (for Example 8), and Example 5 (for Example 9) were used with a sufficient amount of aminobenzalmalonitrile to fluoresce when the mixture (the aminobenzalmalonitrile being incorporated into the flux) was exposed to ultraviolet light at room temperature, but which would decompose when heated to 361° F. so that no observable fluorescence could be noted upon exposure of a soldered joint that had been heated to at least this temperature to ultraviolet light.

*Examples 10, 11, 12 and 13*

These examples are identical to Examples 6, 7, 8 and 9 except that in place of the aminobenzalmalonitrile there is substituted dimethylamino-alpha-phenylcinnamonitrile.

*Examples 14, 15, 16 and 17*

Examples 14, 15, 16 and 17 are the same as Examples 6, 7, 8 and 9 except that in place of the aminobenzalmalonitrile there is substituted para-dimethylaminophenyl.

*Examples 18, 19, 20 and 21*

Examples 18, 19, 20 and 21 are like Examples 6, 7 8 and 9 except that in place of the aminobenzalmalonitrile there is substituted crystalline anthracene.

*Examples 22, 23, 24 and 25*

Examples 22, 23, 24 and 25 are identical to Examples 6, 7, 8 and 9 respectively except that in place of the aminobenzalmalonitrile there is substituted a zinc sulphide phosphor which includes a minor amount of nickel and which is "killed" as a phosphorescent material upon being raised to a temperature of 361° F.

*Examples 26 through 49*

Examples 26 through 49 correspond with Examples 2 through 25 (with Example 26 corresponding to Example 2, Example 27 corresponding to Example 3, etc.), except that in place of the soft solder of Example 1 there is substituted a soft solder consisting of 36 parts of lead and 64 parts of tin.

*Examples 50 through 73*

Examples 50 through 73 correspond with Examples 2 through 25 (Example 50 corresponding to Example 2, Example 51 corresponding to Example 3, etc.), except that in place of the soft solder of Example 1 there is substituted a soft solder containing 2 parts of lead to 1 part of tin.

Any of the literally thousands of soft solder compositions, and any of the literally thousands of fluxes described in the literature and commercially available may be used in the present invention. In the method of the present invention, the joint is soldered with the composition of the present invention, and then the joint is tested by exposing the soldered joint to ultraviolet light. Any joint which has, in fact, been overlooked, namely, not raised to an elevated temperature, will fluoresce and hence immediately be detected.

As above-indicated, the word "phosphor" as used herein is meant the material which luminesces upon exposure to ultraviolet light. By "decomposed" as used herein is meant that the phosphor is rendered into a state in which it will no longer luminesce when exposed to ultraviolet light. This may result from the oxidation of the material, its chemical decomposition, its cistrans isomerization, or its diffusion as by being rendered molten into a diffuse state which does not fluoresce.

The present invention may be embodied in other specific forms without departing from the spirit or essential attributes thereof and, accordingly, reference should be made to the appended claims, rather than to the foregoing specification as indicating the scope of the invention.

I claim:

1. A soft solder composition which includes a soft solder having a solidus temperature of 361° F. to a liquidus temperature of 594° F., a suitable flux for said soft solder, and a sufficient amount of a phosphor which will cause the composition to luminesce when the composition is exposed to ultraviolet light prior to being heated to a temperature of above about 361° F., but which will decompose upon the composition being heated to a temperature of above about 361° F.

2. The method of detecting non-soldered joints which comprises using the composition of claim 1 to solder joints together, and exposing the article containing the joints to ultraviolet light whereby the non-soldered joints will luminesce.

References Cited by the Examiner

UNITED STATES PATENTS

| | | | |
|---|---|---|---|
| 2,664,370 | 12/1953 | Snell et al. | 148—23 |
| 2,664,371 | 12/1953 | Snell et al. | 148—23 |
| 3,139,360 | 6/1964 | Voida | 148—23 |

DAVID L. RECK, *Primary Examiner.*

H. F. SAITO, *Assistant Examiner.*